US008000698B2

(12) United States Patent
Wolman et al.

(10) Patent No.: US 8,000,698 B2
(45) Date of Patent: Aug. 16, 2011

(54) DETECTION AND MANAGEMENT OF ROGUE WIRELESS NETWORK CONNECTIONS

(75) Inventors: Alastair Wolman, Seattle, WA (US); Brian D. Zill, Redmond, WA (US); Jitendra D. Padhye, Redmond, WA (US); Ranveer Chandra, Kirkland, WA (US); Paramvir Bahl, Sammamish, WA (US); Manpreet Singh, New York, NY (US); Lenin Ravindranath Sivalingam, Chennai (IN)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 11/586,137

(22) Filed: Oct. 25, 2006

(65) Prior Publication Data

US 2007/0298720 A1 Dec. 27, 2007

(30) Foreign Application Priority Data

Jun. 26, 2006 (IN) .......................... 1498/DEL/2006

(51) Int. Cl.
*H04M 1/66* (2006.01)
*H04M 1/68* (2006.01)
*H04M 3/16* (2006.01)
(52) U.S. Cl. ..................... 455/423; 455/410; 455/411
(58) Field of Classification Search .................. 455/411; 726/23; 370/338
See application file for complete search history.

(56) References Cited

U.S. PATENT DOCUMENTS

| 6,304,973 | B1 * | 10/2001 | Williams .......................... 726/3 |
|---|---|---|---|
| 6,658,004 | B1 * | 12/2003 | Kadansky et al. ............ 370/394 |
| 7,216,365 | B2 * | 5/2007 | Bhagwat et al. ................ 726/23 |
| 2004/0023640 | A1 * | 2/2004 | Ballai ............................ 455/411 |
| 2004/0255167 | A1 * | 12/2004 | Knight ........................... 713/201 |
| 2005/0157662 | A1 * | 7/2005 | Bingham et al. .............. 370/254 |
| 2006/0123133 | A1 * | 6/2006 | Hrastar ........................ 709/238 |
| 2006/0137009 | A1 * | 6/2006 | Chesla ........................... 726/22 |
| 2007/0025313 | A1 * | 2/2007 | Bhagwat et al. .............. 370/338 |

OTHER PUBLICATIONS

TCP/IP Tutorial and Technical Overview, © 2002 by Rodriguez et al., pp. 126-136.*

* cited by examiner

*Primary Examiner* — Pierre-Louis Desir
*Assistant Examiner* — Joshua Schwartz

(57) ABSTRACT

A method of detecting rogue devices that are coupled to a wired network without generating false negative or false positive alerts is provided. When a wireless monitor detects an observed SSID and/or BSSID, various tests are run to determine whether the observed device is actually coupled to the wired network. To guard against the suspect device spoofing an authorized SSID and/or BSSID, location information is gathered so that the network administrator can pinpoint the location of the rogue device. If the device is not recognized, various other tests are run to determine whether the unrecognized device is actually connected to the wired network. These tests include an association test, a MAC address test, an ARP test, a packet replay test, a correlation test, and/or a DHCP fingerprint test. Once it is determined that the suspect device is a rogue connected to the wired network, an appropriate alert is generated.

19 Claims, 8 Drawing Sheets

DETECTION AND MANAGEMENT OF ROGUE WIRELESS NETWORK CONNECTIONS

CROSS-REFERENCE TO RELATED APPLICATIONS

The present application claims priority from Indian Application for Patent No. 1498/DEL/2006 filed Jun. 26, 2006, which is hereby incorporated herein by reference.

BACKGROUND

Any attack that allows a user to gain unauthorized access to a network is called an intrusion attack. One common security problem facing large organizations is the attachment of unauthorized (or rogue) access points (APs) to corporate networks. The rogue AP creates a "hole" through which unauthorized clients can connect, bypassing various security measures that the IT department may have put in place. A similar attack can be carried out by using ad-hoc wireless networks instead of APs. Another way a corporate, or any specific network may be compromised is when an attacker finds and uses an unsecured AP connected to the network by an unsuspecting employee. The widespread availability of inexpensive, easy-to-deploy APs and wireless routers has exacerbated this problem.

For example, an employee might bring in a wireless AP from home, plug it in to the corporate network without configuring it to require the necessary authentication, and thereby compromise the security of the corporate network. There also are many other scenarios whereby rogue wireless equipment may be connected to a corporate network. For example, a disgruntled employee may deliberately attach an unauthorized AP to the corporate network.

Unfortunately, once an unauthorized AP is attached to any specific network, the security of the network is compromised, even if all the authorized APs are configured to use appropriate authentication mechanisms. Once an unauthorized AP is set up, an unauthorized client may gain access to that specific network without having physical access to the premises of the organization. Thus, detecting these unauthorized or rogue APs is an important challenge.

At first glance, this problem may seem relatively straightforward. An organization simply needs to maintain a database of all authorized APs, which includes the Service Set Identifier (SSID) and Basic Service Set Identifier (BSSID) for every authorized AP. An alarm is raised whenever an unknown SSID and/or BSSID is heard by a wireless sensor. Such sensors can be an AP, a mobile client, a desktop PC with a Wi-Fi network interface, or a dedicated sensor node. All one needs to worry about is how to provide a sufficiently dense deployment of these sensors.

This is the basic mechanism that has been proposed in previous systems, and many wireless management companies offer rogue AP detection as part of their product offerings. Unfortunately, this simplified and seemingly straightforward approach is susceptible to both false negatives and false positives. That is, due to the variety of intrusion attacks that are possible, these simplified approaches often cannot detect the rogue AP, i.e. a false negative. Additionally, due to the deployment of wireless networks at other businesses that may be in hearing range of a wireless sensor, the detection of an AP that is not in the database does not always mean that it is a rogue AP connected to the specific network of concern, i.e. a false positive. Both such failures to properly detect rogue APs present continuing problems for the corporate IT department personnel, as well as allowing serious security breaches to remain.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein are, among other things, various technologies for detecting rogue wireless network connections to a specific network. One such technology utilizes a method that may operate in various network architectures having components that can sense wireless communication, and components that can sense communication on the specific wired network. Once an observed service set identifier (SSID) and/or an observed basic service set identifier (BSSID) is detected on the wireless network, a listing of authorized SSIDs and/or BSSIDs is checked. However, if this check indicates that the SSID and/or BSSID is on the authorized list, the method performs at least one additional test so that a false negative does not occur. Additionally or alternatively, if the check of the list indicates that the SSID and/or BSSID is not authorized, at least one additional test is performed to determine whether the device is actually connected to the specific wired network of concern.

In order to detect a rogue wireless network connection to the specific wired network of concern without generating a false negative, i.e., failing to generate an alarm if a rogue device that is spoofing an authorized SSID and/or BSSID is actually connected to the specific wired network, a review of the stored history of SSIDs and BSSIDs that have been heard before is conducted. In one embodiment, this review is location specific. To determine the location specific information, the signal strength of the broadcast SSID and/or BSSID is observed by multiple wireless sensors whose locations are known. If the purportedly authorized SSID and/or BSSID has not been heard at that particular location before, or has been heard with very different signal strength, the network administrator is notified along with the location information so that the rogue device may be located. The inference engine uses this information, along with the fact that the 802.11 beacon sequence numbers are different, as an indication that there are multiple devices pretending to be one.

In order to generate an alert identifying a rogue wireless device that is connected to the specific wired network of concern without generating false positives, various different tests can be run. This is because the mere ability to detect an unauthorized SSID and/or BSSID does not mean that that device is actually connected to the specific wired network of concern. It could, in fact, be connected to a different wired network for a different organization in close physical proximity to the wireless monitor.

If it is possible to associate with the device having the unauthorized SSID and/or BSSID, and to communicate with a known entity on the specific wired network, then it is determined that the device is a rogue that is connected to the specific wired network. Similarly, if the suspect device is transmitting or receiving packets having a source or destination address (media access control (MAC) or Internet Protocol (IP)) on the specific wired network, it can also be determined that the device is a rogue device connected to the specific wired network. This requires a database of MAC and IP addresses of devices connected to the specific network.

The range of IP addresses on the specific network is usually known to the system administrator, or can be obtained by querying the DHCP servers. The database of MAC addresses can be built in two ways. The MAC addresses of the subnet routers can be obtained by issuing an ARP request for their IP addresses, which are obtained by looking at the routing tables of machines attached to the subnet. For other hosts, their MAC addresses can be obtained by listening for address resolution protocol (ARP) requests broadcast on the wired network, and building a database of MAC addresses of those devices issuing such ARP requests. If a known IP or MAC address is detected as communicating with the suspect device, then it can also be determined that the suspect device is a rogue device connected to the specific wired network.

Another method to eliminate the false positive is to play back multiple instances of data packets that have been heard sent to or from the suspect device over the wireless network. The specific wired network is then monitored to determine if multiple identical instances of those packets may be seen. If so, then it can be determined that the suspect device is connected to the specific wired network of concern. Similarly, the packets on the wireless network that are being broadcast from or to the suspect device can be monitored, as well as the traffic on the specific wired network. This information may then be used to see if there is a correlation between the packets on the wireless and the wired network to determine that the suspect device is, in fact, attached to the specific wired network.

Another method to determine if a rogue device is connected to the specific wired network is to listen for dynamic host control protocol (DHCP) requests on the wired network. These DHCP requests are then analyzed to determine the type of device issuing the request. Once the type of device has been determined, it can be checked against a list of authorized device types. If the device issuing the DHCP request is not an authorized device type, then it can be determined that the suspect device is a rogue that is connected to the specific wired network. Additionally, even if the system of the present invention determines that it is an authorized device type, if the device is not one of the few authorized devices of this type, e.g. because its MAC address is not recognized as that of one of the authorized devices, the system can flag the suspect as a rogue.

Other aspects, objectives and advantages will become more apparent from the following detailed description when taken in conjunction with the accompanying drawings.

BRIEF DESCRIPTION OF THE DRAWINGS

The accompanying drawings incorporated in and forming a part of the specification illustrate various embodiments of the technology described herein and, together with the description, serve to explain some of the operational principles of the described technologies. In the drawings.

Figure 1:
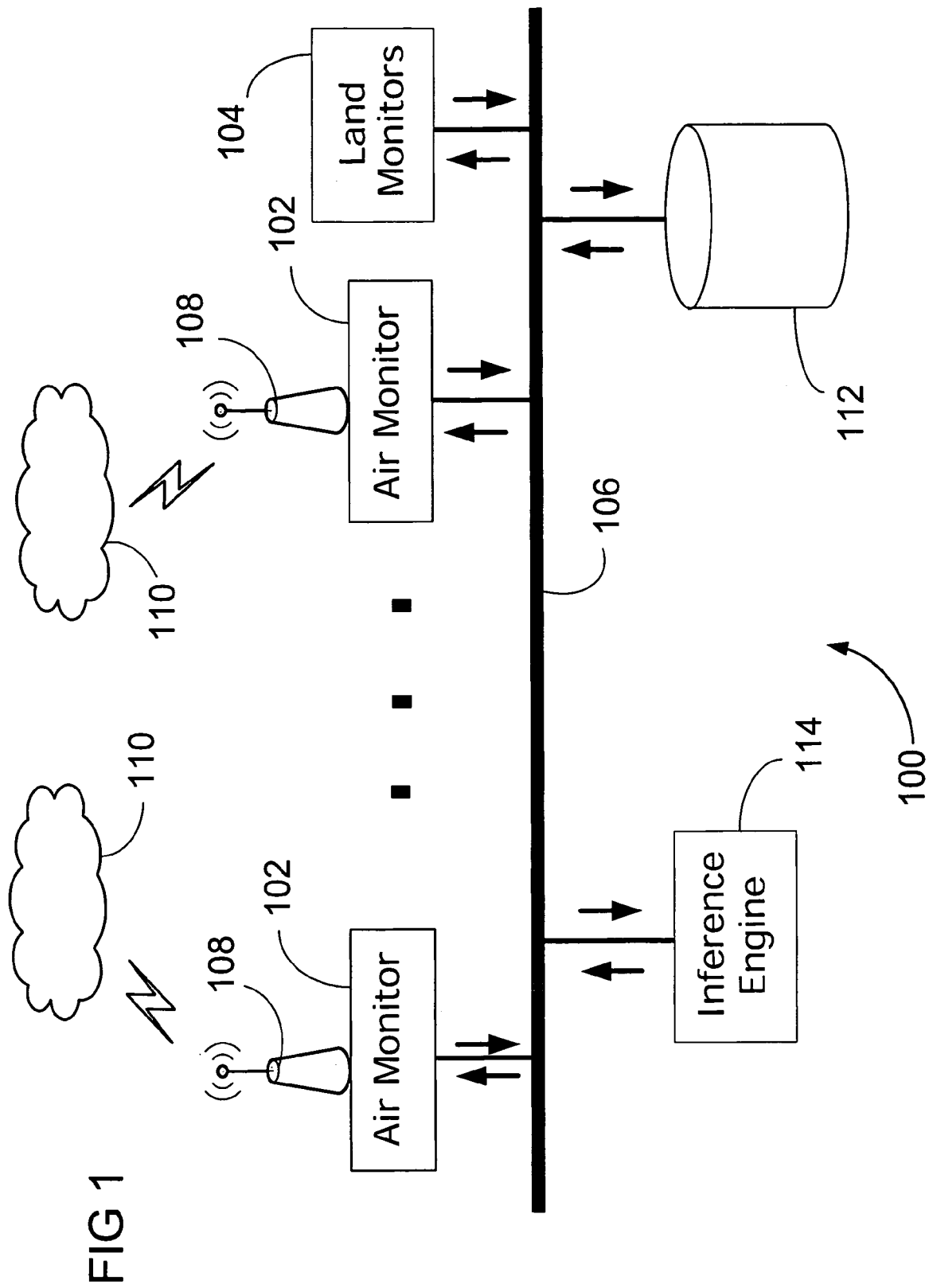
FIG. 1 is a simplified architecture block diagram of a dense array of inexpensive radios (DAIR) architecture to which some embodiments of the described technologies are well suited.

While the described technologies will be described in connection with certain specific embodiments, there is no intent to limit the claimed subject matter to those embodiments.

DETAILED DESCRIPTION

The effectiveness of any management solution for wireless networks depends upon the ability to perform radio frequency (RF) sensing from a large number of physical locations. This is important for both coverage and for pinpointing the precise location of the problem. One architecture which provides such sensing is known as DAIR (Dense Array of Inexpensive Radios), which allows for wireless network management applications to be built that benefit from dense RF sensing. Such a DAIR architecture is described in co-pending U.S. patent application Ser. No. 11/474,652, entitled PLATFORM FOR ENTERPRISE WIRELESS NETWORK MANAGEMENT APPLICATIONS, filed on Jun. 26, 2006 and assigned to the assignee of the instant application, the teachings and disclosure of which are hereby incorporated in their entireties by reference thereto.

As discussed in this co-pending application, DAIR provides a framework or architecture for detecting and diagnosing faults in wireless networks using existing desktop infrastructure. This approach is based on two observations. First, in most networked environments one finds plenty of desktop machines. The machines are generally stationary and are connected to wall power. They have good wired connectivity, spare central processing unit (CPU) cycles, and free disk space, and high-speed universal serial bus (USB) ports. Second, inexpensive USB-based wireless adapters are readily available and prices continue to fall. By attaching USB-based wireless adapters to desktop machines, and dedicating the adapters to the task of monitoring the wireless network, a low cost monitoring infrastructure is created. Additionally, there are many other kinds (i.e. non-USB) of wireless network interfaces that one can attach to a desktop machine.

The low cost allows an enterprise to implement a dense deployment. The sensor density has a large impact on the coverage (i.e. the probability that a fault will be detected) and on the quality of the fault diagnosis. As such, DAIR provides a low-cost way of deploying dense sensors that act in a cooperative manner to perform fault detection and diagnosis tasks.

In many networked environments, desktops are usually stationary. This gives a dense deployment of RF sensors whose locations are known and fixed. The stationary infrastructure ensures that coverage of the area being managed is adequate. Having a fixed location for the sensors also eases the problem of location determination, which is a useful technique for solving many wireless management problems. Finally, stationarity of the sensors allows a DAIR-based management system to maintain meaningful histories of wireless network behavior seen at specific locations.

Desktop machines generally have good wired connectivity. As will be discussed more fully below, having access to the specific wired network is beneficial, and allows the system to do a better job of monitoring and diagnosing the wireless network. Additionally, and apart from providing spare CPU cycles and spare disk capacity, the desktop machines utilized in one embodiment of the present invention also offer access to wall power, and hence no power constraints. This permits more comprehensive monitoring of the wireless network.

As illustrated in FIG. 1 and as described in the above-identified co-pending application, the DAIR system 100 has two kinds of monitoring nodes, AirMonitors 102 and LandMonitors 104. The AirMonitors 102 are desktop computers belonging to individuals, e.g. employees, students, family members, etc., equipped with wireless cards or adapters 108. AirMonitors 102 monitor wireless traffic that is "in the air" 110. The LandMonitors 104 are computers that monitor traffic on wired networks 106. For example, a LandMonitor 104 may be used to monitor DHCP requests on each subnet. LandMonitors 104 may not need to be as densely deployed as AirMonitors 102.

The data gathered by the monitoring nodes is stored in one or more of a database server(s) 112. This data is analyzed by one or more inference engines 114. The inference engines 114 control the monitors 102, 104 by assigning them specific monitoring tasks. A monitor node 102, 104 may simultaneously serve requests from several different inference engines 114. The ability to perform multiple monitoring tasks at the same time aids scalability of the DAIR architecture 100.

The monitor nodes 102, 104 filter and summarize the data before reporting it to the database 112. For example, if an inference engine 114 is interested in monitoring the presence of unauthorized access points (APs) on a specific channel, the inference engine 114 will issue a request to the AirMonitors 102 to switch to that channel, and periodically report all the unique wireless network names (e.g. SSIDs) and device addresses (e.g., BSSIDs (Media Access Control (MAC) addresses of APs)) that they have heard. The inference engine 114 can then look through the data in the database 112 to detect unknown SSIDs or BSSIDs that may signal presence of unauthorized APs.

The monitor nodes 102, 104 are not limited to passive observations. They can also send packets. For example, the inference engine 114 may request one of the AirMonitors 102 to attempt to associate with an unknown AP in order to gather more information. This requires the AirMonitor 102 node to send association requests and to process incoming responses.

Having provided a brief overview of one architecture 100 to which an embodiment of the present invention finds particular applicability, the following discussion will describe embodiments of this invention, including the best mode known to the inventors for carrying out the invention. Variations of those embodiments may become apparent to those of ordinary skill in the art upon reading the following description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the below-described elements in all possible variations thereof is encompassed by the invention unless otherwise indicated herein or otherwise clearly contradicted by context.

One embodiment of the present invention is particularly applicable to intrusion attacks that involve connection of unauthorized wireless equipment to a specific network. As discussed above, there are many scenarios whereby rogue wireless equipment may be connected to a specific network of concern. For example, an employee might bring in a wireless AP from home and plug it in to the specific network without configuring it to require the necessary authentication. Or a disgruntled employee may deliberately attach an unauthorized AP to the specific network. Once an unauthorized AP is attached to the specific network, the security of the network is compromised even if all the authorized APs are configured to use appropriate authentication mechanisms. Thus, detecting these unauthorized or "rogue" APs is an important challenge.

One may argue that the rogue AP problem is best solved by securing the wired network. For example, if the 802.1× protocol is deployed on the wired network, or if some form of MAC address filtering is employed on the wired network, unauthorized access points will not be able to connect to the wired network. Similarly, virtual private network (VPN) or Internet protocol security (IPSec) based solutions can limit access to network resources to authorized clients. While these solutions are certainly useful, that they do not fully solve the problem. An authorized client, equipped with a wireless and a wired interface, can bridge the two network interfaces to provide link-layer forwarding, or to provide IP-level forwarding by acting as a network address translator (NAT). The wireless interface can then be put in ad-hoc mode, and used to allow unauthorized clients to connect to the wired network.

As discussed above, it may appear that the monitoring infrastructure does not need to do much. An organization simply needs to maintain a database of all authorized APs, including their SSIDs and BSSIDs. An alarm is raised whenever an unknown SSID and/or BSSID is heard by a wireless sensor. This sensor can be an AP, a mobile client, a desktop PC with a Wi-Fi network interface, or a dedicated sensor node. Unfortunately, this straightforward approach is susceptible to both false negatives and false positives. We now discuss how embodiments of the present invention can be used to minimize false positives and false negatives.

Figure 2:
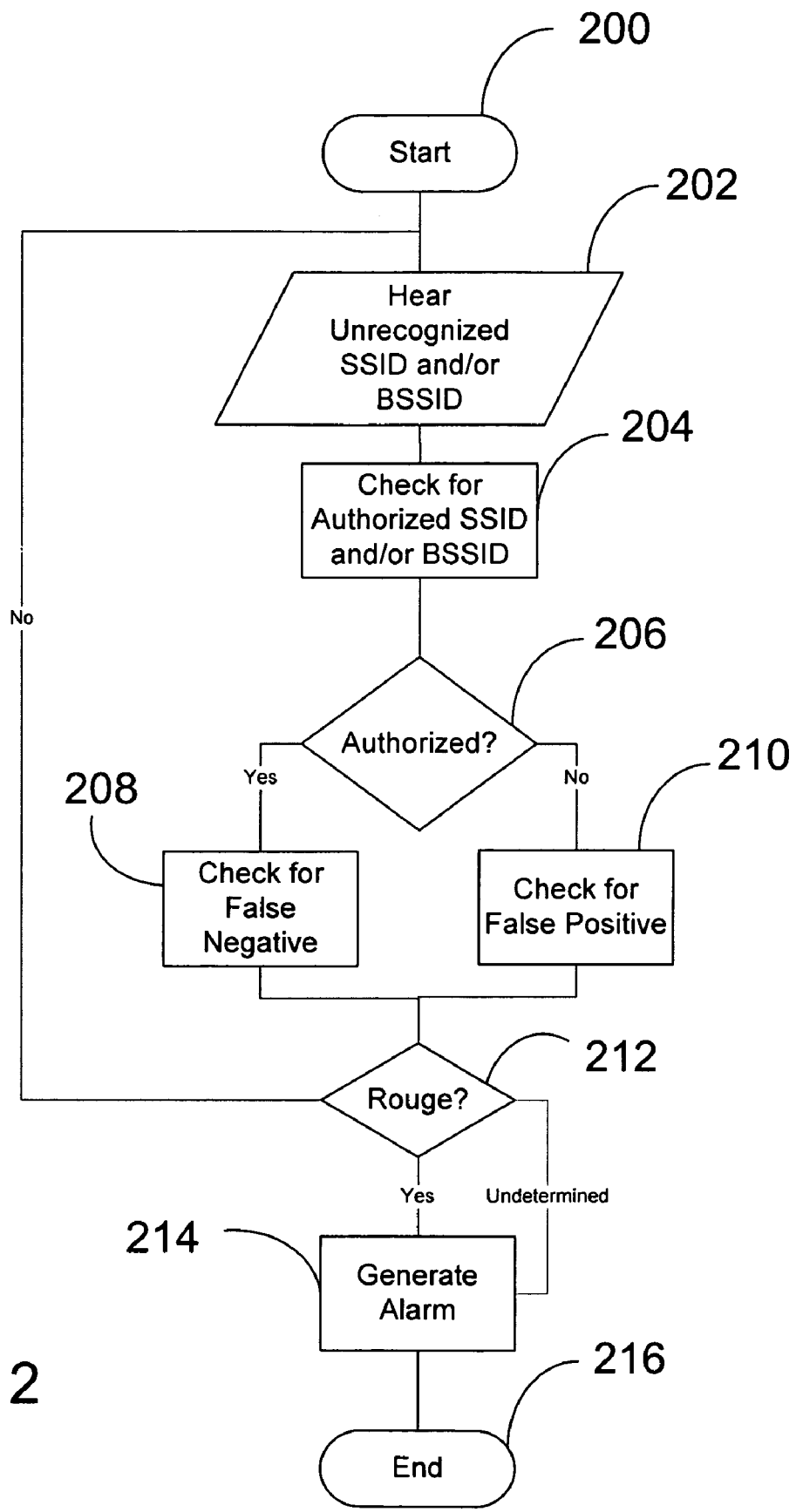
FIG. 2 is a simplified flow diagram illustrating an embodiment of a method of rogue wireless network connection detection and management.

As illustrated in the simplified flow diagram of FIG. 2, the system of the present invention begins 200 by listening 202 for SSIDs and/or BSSIDs on the wireless network. The system checks 204 the database of authorized SSIDs and BSSIDs to see if the observed SSIDs and/or BSSIDs are authorized 206. If they are authorized, then the system must run additional tests to check for false negatives 208. Similarly, if this check reveals that they are not authorized, the system must run additional tests to check for false positives 210. Once these various tests are run, the system will be able to identify if the suspect is a rogue 212. If it is, the system can generate an alarm 214 for the network administrator before ending 216. However, if the system cannot determine whether or not the suspect is a rogue with certainty, one embodiment of the present invention will still generate an alarm 214 to allow the system administrators to investigate the situation before ending.

It should be noted that, in the following description, various tests for eliminating false positives and false negatives will be presented in accordance with various embodiments of the present invention. However, the order in which this description proceeds should not be taken as a requirement. Indeed, the tests discussed below can be run in any order. Similarly, embodiments of the present invention may simply use one or more such tests as desired.

One of the problems existing with prior detection systems is that of false negatives. That is, a malicious user may configure a rogue AP to advertise the same SSID and BSSID as one of the authorized AP devices. The systems described in the Background section above will not flag a problem under these conditions because the SSID and BSSID are in the database, which is why this type of a situation is termed a false negative.

Figure 3:
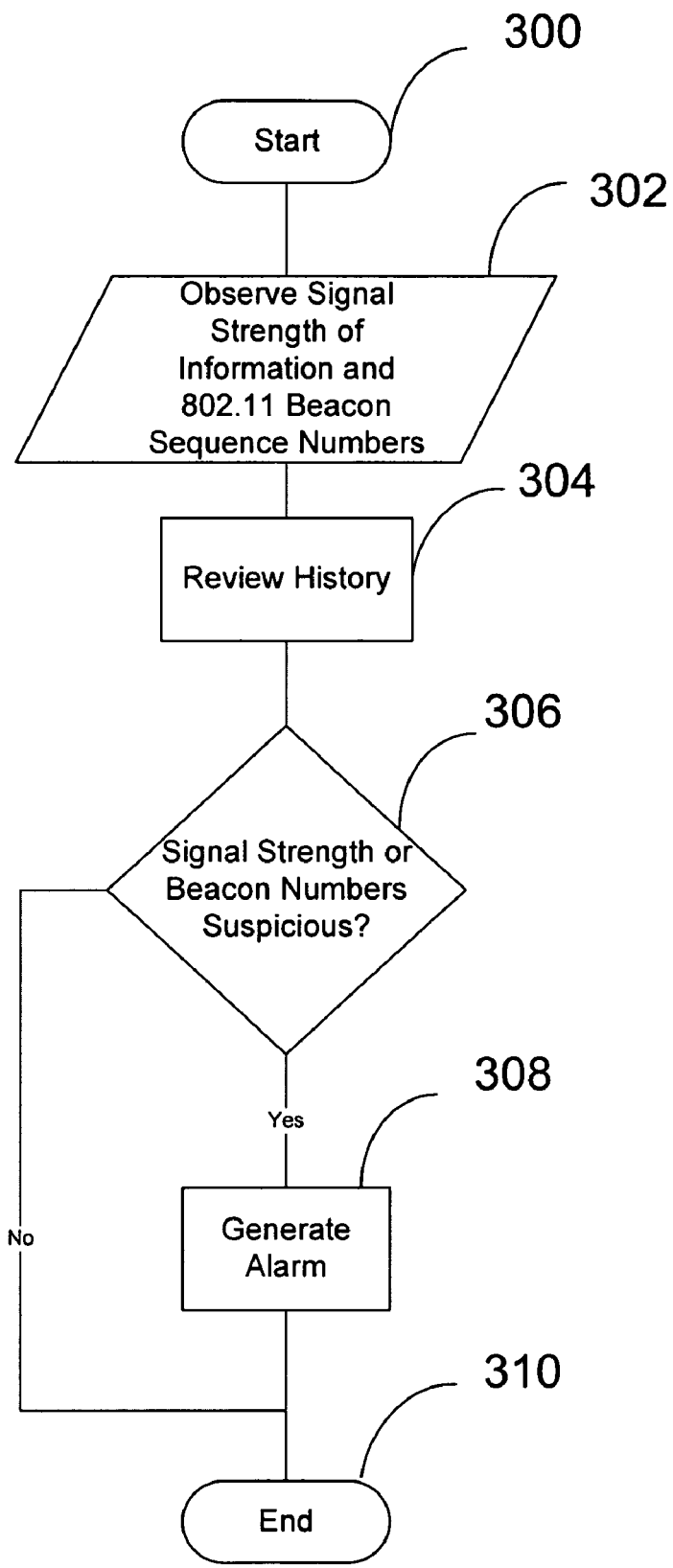
FIG. 3 is a simplified flow diagram illustrating an embodiment of a test to eliminate false negatives in accordance with some of the described technologies.

To guard against such false negatives, as illustrated in FIG. 3, one embodiment begins 300 by using the observed signal strength 302 of packets received at the different AirMonitors 102 to determine the approximate location of the device in question. This information is used, along with the fact that 802.11 beacon sequence numbers are suspicious, as an indication that there are multiple devices pretending to be one. That is, since each 802.11 access point (AP) sends beacons with increasing sequence numbers, if a rogue AP tries to pretend to be an authorized AP, and if the authorized AP is still active, the sequence numbers from the two will get intermingled. Therefore, the DAIR system will not see a monotonically increasing series of sequence numbers for beacons sent for this BSSID. This will provide an indication to the system that there are multiple devices pretending to be one. Historical information may also be used 304 in an embodiment to assist with this process. Specifically, e.g., a set of AirMonitors 102 may suddenly begin hearing what appears to be an "authorized" AP with strong signal strength. However, for the past three months they have never heard that AP with that signal strength before. If either of these conditions are true, i.e. the signal strength and/or the beacon numbers are suspicious 306, this condition is flagged 308 so that the network administrator can use the location information to look for the rogue AP, because the location of the legitimate AP is known. Both the stationarity of the AirMonitors 102 and their ability to continuously monitor the wireless spectrum allow this embodiment to gather the historic data necessary to eliminate this type of false negative.

Another problem with the prior systems is that of false positive alarms. This occurs, e.g., in many office buildings where one is likely to overhear APs deployed by other nearby corporations. However, the fact that an AirMonitor 102 can hear an AP that is not in the database 112 of authorized APs is not necessarily a cause for alarm, especially in the situation just described. The tests for detecting whether the suspect is attached to the specific network 106 in accordance with embodiments of the present invention depend on detecting that the suspect device is forwarding packets between the wireless 110 and the wired network 106.

In order to eliminate some of these false positive alarms, an embodiment of the present invention provides more information to the network administrator. In particular, the network administrator needs to know whether this "suspect AP" (hereinafter referred to as the suspect) is attached to the specific network 106. To help answer that question in many different situations, one embodiment utilizes at least one of a number of automatic techniques to better characterize the risk. The following description will illustrate a sequence of tests that may be implemented by embodiments of the present invention to help the system administrator answer this question.

Before describing these tests, it should be noted that the term "Access Point" (AP) is used rather loosely in practice. The suspect device can forward packets to the wired network 106 in one of two ways. First, the suspect may forward packets at the link layer ("layer 2"), without involving higher layers of the networking stack. The term "access point" (AP), as defined in the IEEE 802.11 standard, refers to such a link layer forwarding device. Most commercial-grade access points are link-layer forwarders. As per the 802.11 standard, the AP is a device that acts as a bridge between the wireless network 110 and the wired network 106 backhaul. This is the functionality that most commercial-grade APs provide (along with support for 802.1x). Second, the suspect may forward packets at the IP layer, by acting as a router. Most wireless devices designed for home networking are IP-layer forwarders. These devices combine AP and router functionality, usually along with NAT capabilities.

In this application, the term AP is used to cover both definitions, unless a specific test is applicable to only one type of device and not another, in which case a distinction will be drawn. For example, the first test described below can reduce false positives regardless of whether the suspect is an 802.11 standard AP or a wireless router. That is, the following will first describe a test that can reduce false positives regardless of whether the suspect is a link layer or IP forwarder. Next is described a test that is useful when the suspect is a link layer forwarder. In other words, tests that find particular usefulness when the suspect is really an AP, and not a wireless router. Finally, the case where the suspect is an IP forwarder, i.e., when the suspect is, in fact, a wireless router and not an 802.11 AP is considered.

Note that while the following will describe these tests assuming that the rogue device is either an AP or a router, the ideas can be applied with minimal modifications that will be apparent to those of ordinary skill in the art from the following description to detect rogue ad-hoc networks as well.

Figure 4:
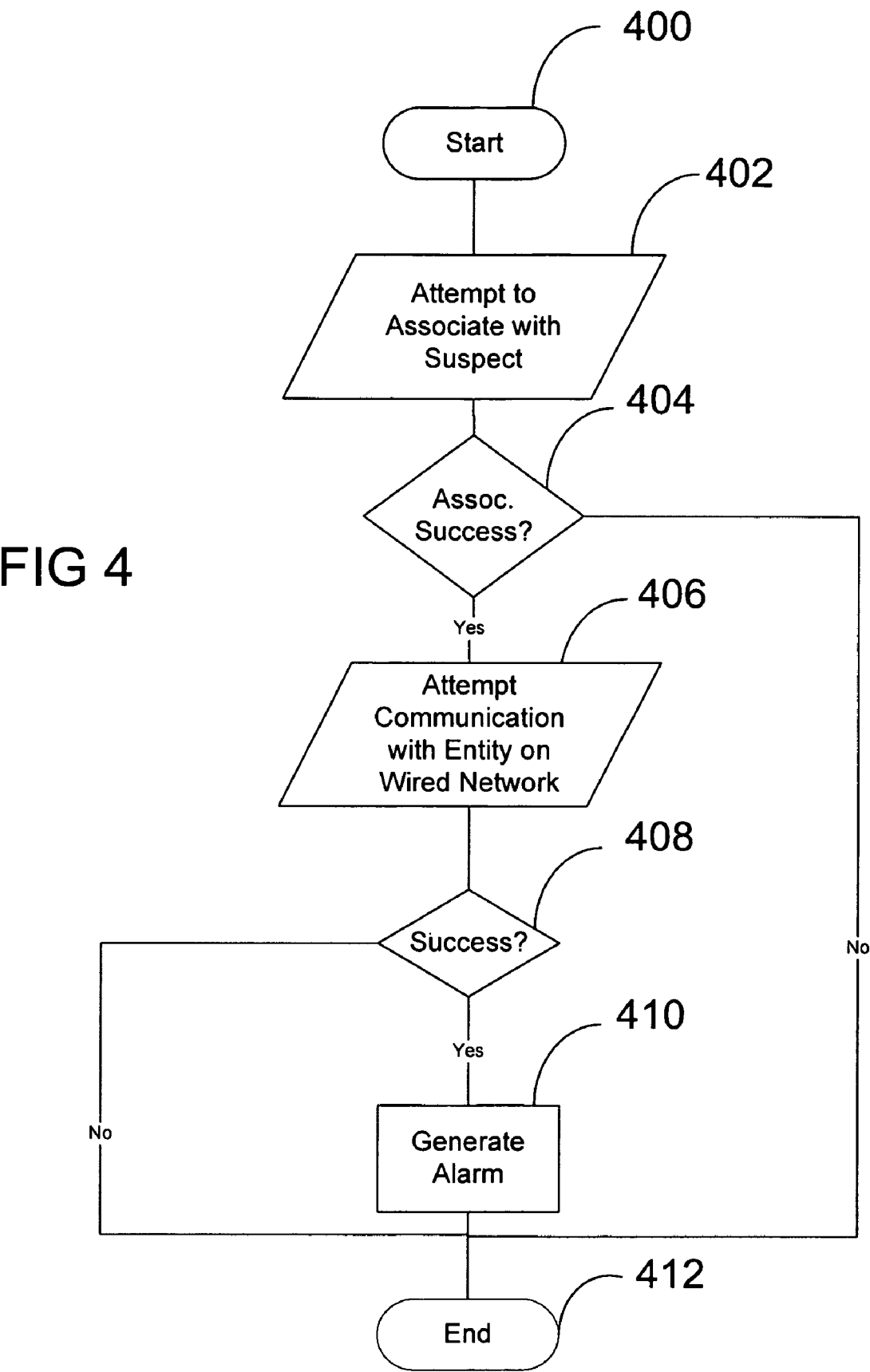
FIG. 4 is a simplified flow diagram illustrating an embodiment of an association test to eliminate false positives in accordance with some of the described technologies.

One test that may be used to eliminate the false positive alarm is an association test illustrated in FIG. 4. Once begun 400, and to determine if the suspect is connected to the specific wired network 106, and hence eliminate the false positive alarm, one of the AirMonitor 102 nodes attempts to associate with it 402. In an embodiment of the present invention that operates on the DAIR architecture 100, the inference engine 114 directs one of the AirMonitors 102 to attempt this association. If this is successful 404, the AirMonitor 102 then attempts to communicate 406 with (e.g. ping) one or more well-known entities that are only accessible from within the specific wired network 106. If this test succeeds 408, then the suspect must be attached to the wired network 106. As such, the system will generate an alarm 410 for the system administrators before ending 412.

The question of which AirMonitor(s) 102 should be tasked to carry out the association test is a matter of policy. In one embodiment, one or more of the AirMonitors 102 that saw beacons or data packets transmitted from the suspect may be selected manually by the system administrator. In an alternate embodiment, an automatic selection policy that will take into account factors such as signal strength of observed packets is utilized.

While success 408 of the association test can determine if the suspect AP (either a true AP or a wireless router) is attached to the specific wired network 106, if the attempt to associate 404 or ping 408 fails, perhaps because the AP has MAC address filtering or wired equivalent privacy (WEP) enabled, it cannot be conclusively determined at this point that this suspect AP is not attached to the specific wired network 106. As such, more tests must be run before this determination can be made.

Since the suspect device could be a true AP or a wireless router, each of which having different capabilities, different tests can be run based on these differences in an effort to determine if the suspect is really connected to the specific wired network 106. The following two tests are particularly effective to answer this question, and hence eliminate a false positive alarm, when the suspect is an AP.

Figure 5:
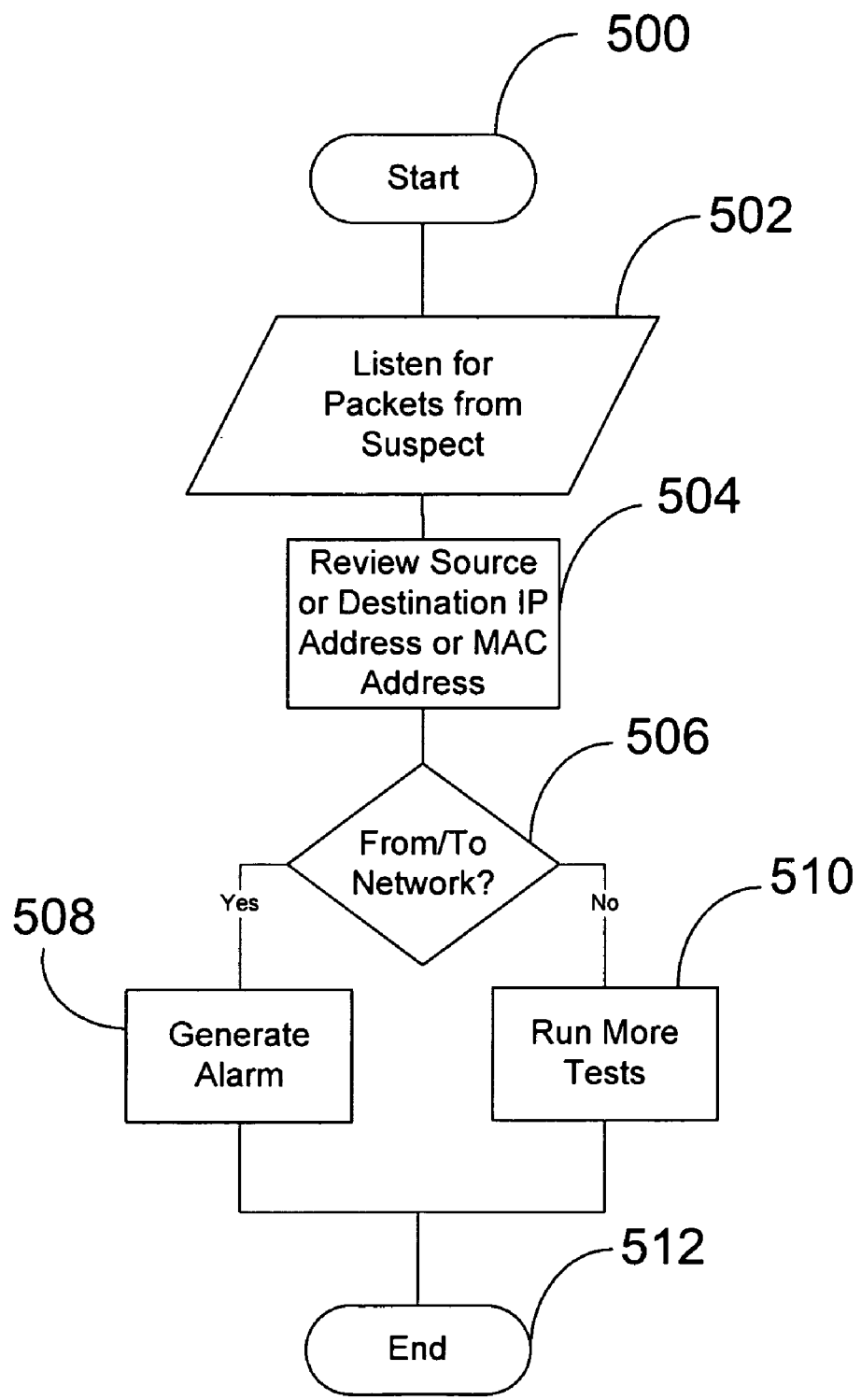
FIG. 5 is a simplified flow diagram illustrating an embodiment of a source/destination address test to eliminate false positives in accordance with some of the described technologies.

One test that is particularly effective when the suspect is an AP is a Source/Destination address test illustrated in FIG. 5. This test begins 500 and is used when any AirMonitor 102 can observe 502 data packets that are either destined to or transmitted from the suspect. These packets can yield clues about whether someone is using the suspect as an entry point to the specific wired network 106. The inference engine 114 scrutinizes 504 the data packets captured by the AirMonitors 102 for source and destination addresses. If 506 data packets sent to the suspect carry a destination address of a device known to be on the specific wired network 106 (or conversely, if packets from the suspect carry such a source address), then it can reasonably be concluded that the suspect is acting as an illicit gateway, and an alarm may be generated 508 before ending 512. If the packets are not encrypted, the inference engine 114 will look at the destination IP addresses to see if any device associated with the suspect is communicating with hosts inside the specific wired network 106. By comparing the address with known IP subnet ranges on the specific wired network 106, this test can determine if the communication is with a host on the specific network. However, if it cannot be determined that the suspect is communicating with hosts inside the specific network, additional test may need to be run 510.

If the packets are encrypted, or if the IP address test can not determine that the suspect is communicating with hosts inside the specific network, the inference engine 114 can look at the source or destination MAC address of these packets and compare them with the MAC addresses of devices known to be on the specific wired network 106. If a device associated with the suspect is communicating off the subnet that the suspect is connected to, then the destination (or source, depending on direction of communication) MAC address in their packets will be the MAC address of the subnet router because an AP acts as a bridge. Otherwise, the MAC address will be a MAC address of a device directly connected to the subnet to which the suspect is connected. These MAC addresses are part of the 802.11 packet header, which is never encrypted.

This test utilizes a database 112 of the MAC addresses of subnet routers and other devices on the specific wired network 106. The typical wired network is divided into subnets. Therefore, if the suspect device is connected to the specific network, it is connected to one of these subnets. There are two kinds of hosts on a subnet: subnet routers, and ordinary machines. Subnet routers are special in the sense that any traffic that leaves or enters the subnet goes through them. Within the subnet, the machines communicate with each other directly. The AirMonitors 102 and/or LandMonitors 104 can automatically contribute the MAC addresses of their own subnet routers. The MAC addresses of the subnet routers can be obtained by issuing ARP requests for the IP addresses of the subnet routers, which are obtained by looking at the routing tables on the AirMonitors 102 and/or LandMonitors 104.

The MAC addresses of other devices are collected via an ARP LandMonitor 104 that listens for ARP requests which are broadcast on the wired network 106. ARP requests are special packets that ordinary hosts on a subnet send from time to time in course of their normal operation (i.e. these are not special packets that we make them generate). These packets are sent to a broadcast address (so they go to all hosts attached to that subnet), and the source address of these packets is the MAC address of the machine that sent them. The LandMonitors 104 listen for ARP requests, and make note of the source address. Thus, they slowly build up a database of MAC addresses of ordinary hosts connected to that subnet. The ARP LandMonitor 104 periodically summarizes the list of MAC addresses that issued ARP requests, and submits those summaries to the central data collection server having the database 112 of the DAIR architecture 100. This combined database (subnet routers and ordinary hosts) is then used to perform the source/destination address test.

Another scenario arises when someone attaches a wireless router to the specific wired network 106. This is because the source/destination address test works only if the suspect is a link layer forwarder. When the AP and IP routing functionality are implemented in the same box, i.e. when the suspect is an IP-layer forwarder, the destination MAC address of the wireless traffic on the wireless network 110 will simply be the wired MAC address of the wireless router. To handle the case of wireless routers that combine AP and NAT functionality forwarding encrypted traffic, two additional tests are available.

Figure 6:
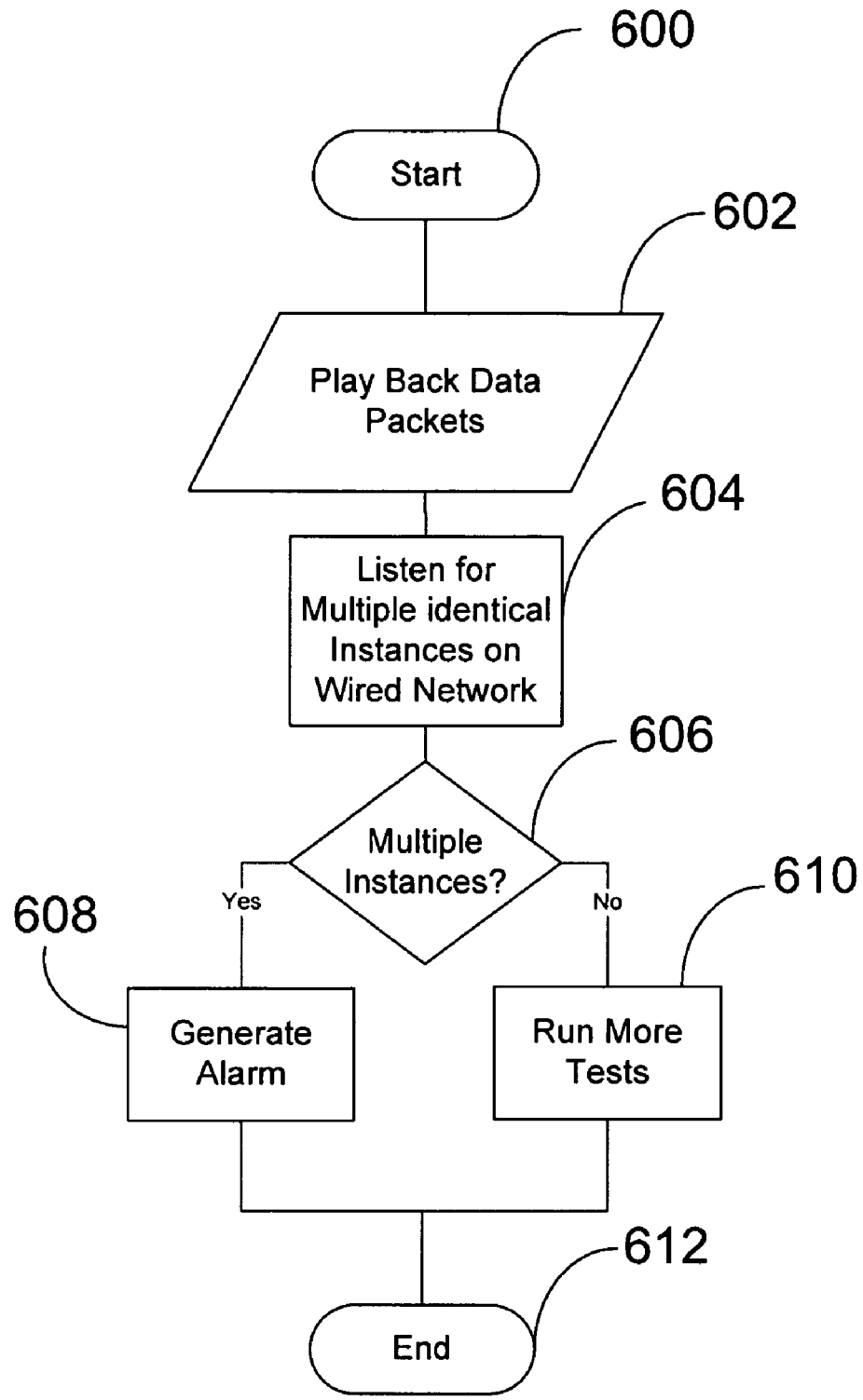
FIG. 6 is a simplified flow diagram illustrating an embodiment of a packet replay test to eliminate false positives in accordance with some of the described technologies.

One additional test is hereinafter referred to as a replay test and is illustrated in FIG. 6. For this test, the inference engine 114 begins 600 by requesting one or more of the AirMonitors 102 to play back 602 on the wireless network 110 some of the data packets that the AirMonitors 102 overheard which carry the suspect BSSID. In an embodiment, each packet is played back a number of times, for example 5 times. The playback is limited to playing back data packets that are destined to the suspect device (i.e. the "TO DS" flag in the 802.11 header is true). The selected AirMonitors 102 continue to play back the data packets over the wireless network 110 for either a fixed duration or, in an alternate embodiment until a certain number of packets have been played back.

On the wired network 106 side, a LandMonitor 104 is deployed on each subnet in such a way that it can analyze 604 all the packets that are headed to the subnet router. The AirMonitor 102 that is about to replay the packet, alerts all the LandMonitors 104 before it starts to replay the packets. The LandMonitors 104 start checking 606 to see if multiple identical instances of the same packets appear on the wired network 106. If multiple instances of duplicate packets are spotted on the wired network 106 as the AirMonitor 102 is replaying the packets back, the LandMonitor 104 determines that the suspect device is connected to the wired network 106. In this case, an alarm is generated 608. In one embodiment several heuristics are used to make sure that spurious retransmissions and certain other types of network traffic do not trigger false alarms.

The replay test is not adversely affected by MAC address filtering by the suspect device. This test will also operate in the presence of encryption, as long as the encryption protocol does not include protections against packet replay. Most wireless security protocols rely on WEP, and are susceptible to replay attacks at least for short durations. As with association test discussed above, the AirMonitors 102 that carry out the replay test may be manually selected or, in an alternate embodiment, may be automatically selected. If this test fails, additional tests may be run 610.

Figure 7:
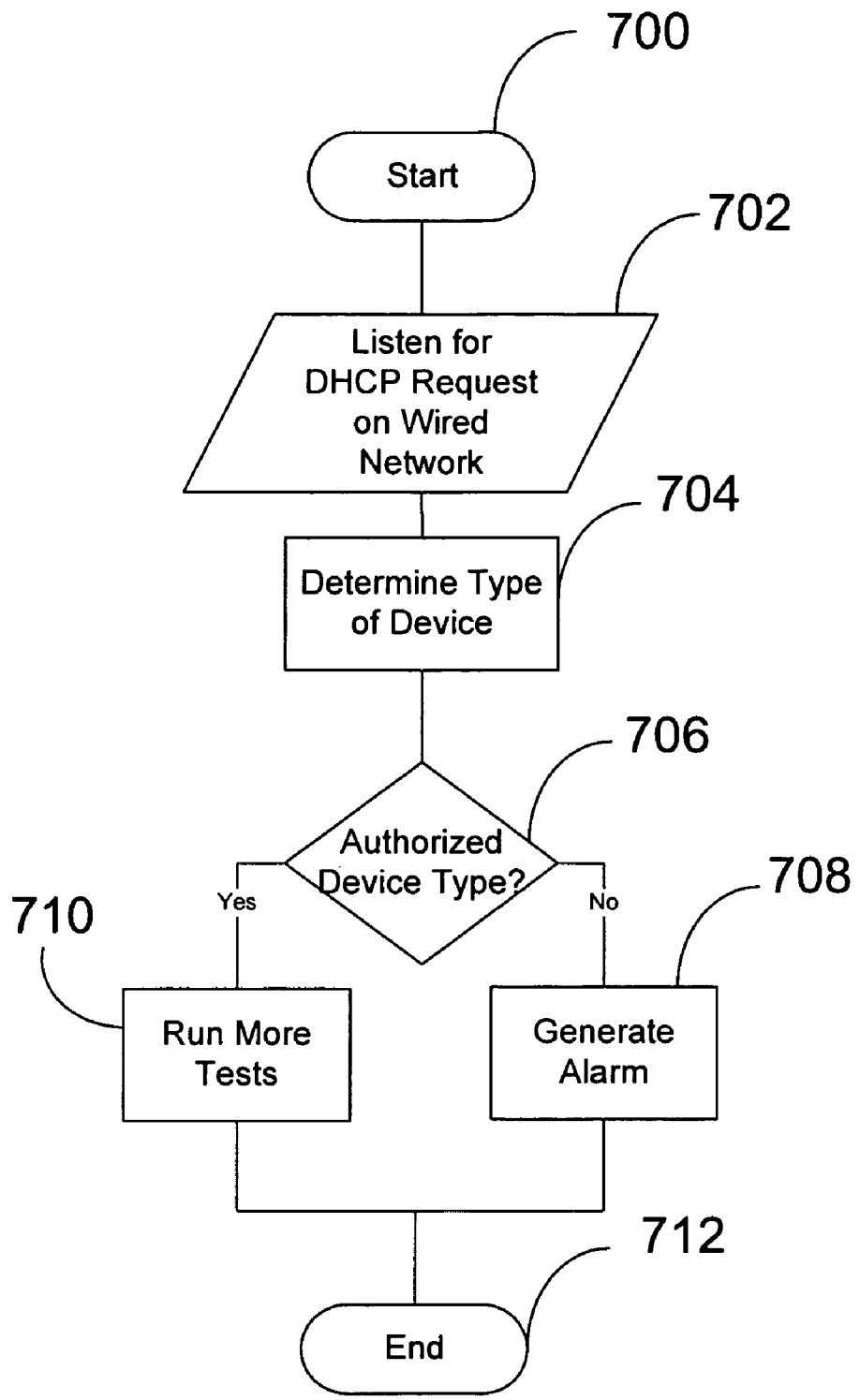
FIG. 7 is a simplified flow diagram illustrating an embodiment of a DHCP signature test in accordance with some of the described technologies.

Another test is known as the DHCP (Dynamic Host Configuration Protocol) signature test and is illustrated in FIG. 7. DHCP is a common way for a network device to request an IP (Internet Protocol) address (and often other network configuration information) from a network to which it is attached. In a typical case, a network device attaching to a network will issue a DHCP "DISCOVER" or "REQUEST" message. These messages are used to find and/or make a request to a DHCP server. In addition to requesting an IP address, a number of other optional configuration parameters may also be requested. If a DHCP server is present on the network, it will typically reply with an "OFFER" or acknowledgement "ACK" message. These reply messages provide the network device with an IP address and other optional configuration parameters.

When a wireless device wants to communicate with other devices on the wired network 106, the wireless device is very likely to issue a DHCP request shortly after it is plugged in to the wired network 106. Therefore, this test is begun 700 by using a DHCP LandMonitor 104 which listens 702 to broadcasts of DHCP requests on the wired network 106 and inserts summaries of these requests into the database 112. The type of device that issues the DHCP request is detected 704 by the inference engine 114 by parsing the DHCP requests and using certain characteristics of that request to infer the device type. The DHCP signature test may operate independently of all other tests, and does not need to include any wireless component.

The DHCP protocol has a number of features that allow the DHCP signature test to identify rogue devices coupled to the wired network. First, the protocol supports a large number of options. Within a DHCP request, one can use the following information: the order and the contents of the DHCP options field; the contents of the DHCP client class information; the order and the contents of the DHCP parameter request list; and finally even the host name (which is often the actual name of the product). DHCP requests can contain a variety of options, and the DHCP protocol allows for the content of some of these options to be highly variable between implementations. The contents and ordering of the DHCP options, in particular the parameter request list, can be used as a fingerprint to determine the type and the manufacturer of the device that issued the request. For example, requests that come from WINDOWS clients can be distinguished from those that come from wireless routers. If the inference engine 114 detects a DHCP request whose fingerprint does not match 706 any of the device types that are authorized to be connected to the specific wired network 106, then it raises an alarm 708 before ending 712. However, if this test fails, additional test may be run 710. One such additional test compares the MAC address of the device issuing the DHCP request to a listing of known MAC addresses for that type of device, e.g. a list of MAC addresses for legitimate wireless routers. If the MAC address for the suspect device does not match any of the MAC addresses on the list, then this device is likely a rogue and an alarm will be generated.

Exemplary fields and options present in DHCP messages that are useful for fingerprinting include, but are not limited to, "Parameter Request List" and "Vendor Class Identifier" options. For some network devices that have default host name fields, the "Host Name" option also is useful because some manufacturers place either their name or the device name in that field. The "Parameter Request List" option (a list of parameters the client is requesting of the server) is especially useful as it has arbitrary length, and the order in which the requested parameters are listed is also arbitrarily chosen by the implementer.

Figure 8:
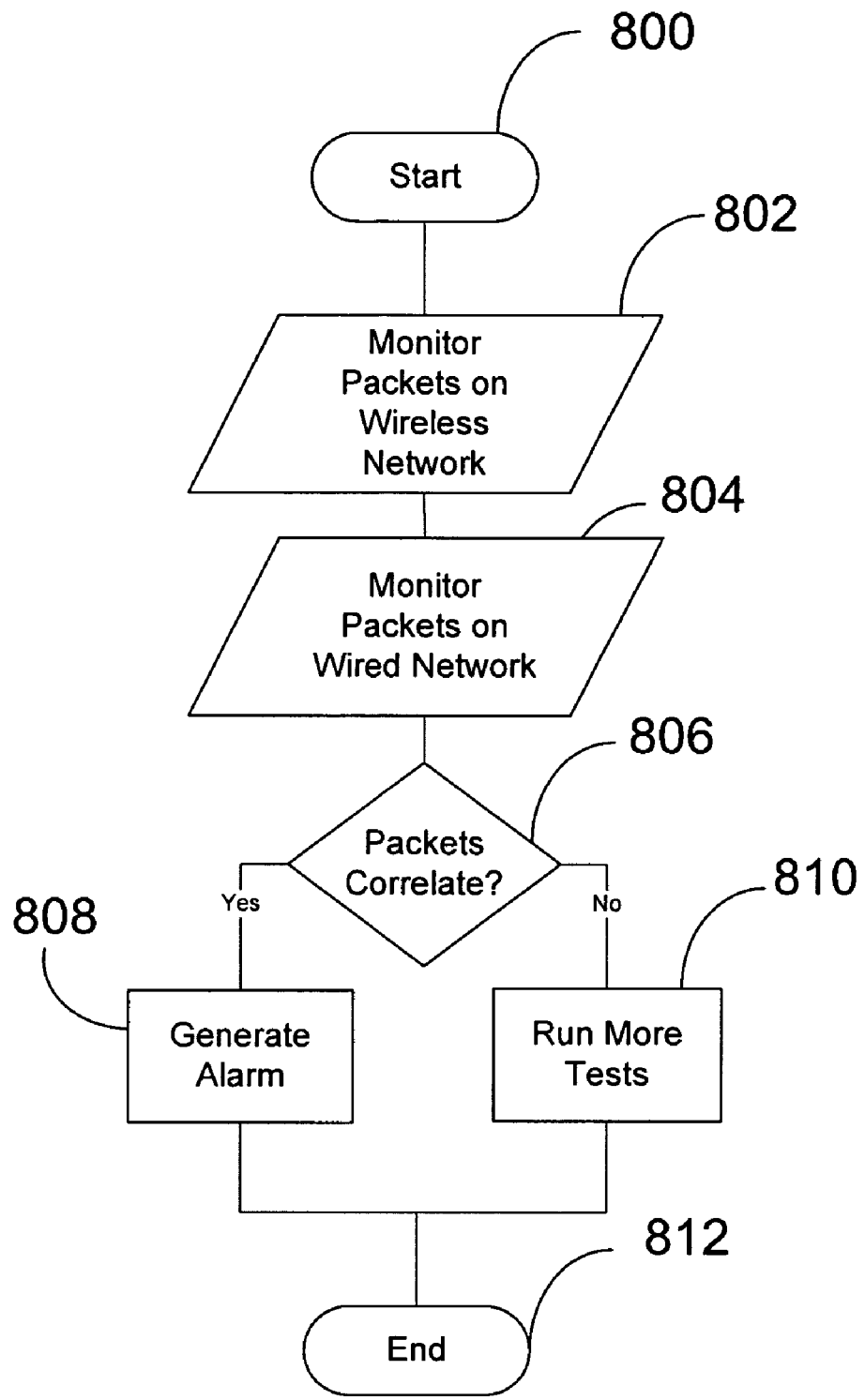
FIG. 8 is a simplified flow diagram illustrating an embodiment of a packet correlation test to eliminate false positives in accordance with some of the described technologies.

An additional test that is used by one embodiment of the present invention is a correlation test illustrated in FIG. 8. Here, the system will begin 800 by listening 802 for packets sent on the air or wireless network 110 and by listening 804 for packets sent on the wired network 106. The system will check 806 for correlation of these packets using both the length of the packets and the times at which they were sent. By observing the same traffic on the wireless 110 and wired networks 106, the system of the present invention can detect that the suspect is attached to the wired network 106, and can generate an alarm 808 before ending 812. If no this test fails, additional tests can be run 810. In one embodiment, either Ethernet repeaters rather than switches, or in an alternate embodiment enabled port mirroring on the Ethernet switch to which the device is directly attached are used. In other words, the system obtains access to unicast traffic on the wired network 106 generated by the wireless router. This is challenging, especially when it is not known where or even whether the device is attached to the wired network 106.

The foregoing description of various embodiments has been presented for purposes of illustration and description. It is not intended to be exhaustive or to limit the invention to the precise embodiments disclosed. Numerous modifications or variations are possible in light of the above teachings. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of detecting rogue wireless network connections to a specific wired network, the method comprising the steps of:

storing a listing of authorized Service Set Identifiers (SSIDs) and authorized Basic Service Set Identifiers (BSSIDs) for legitimate access points;

storing historical information comprising signal strengths at which the authorized SSIDs and the authorized BSSIDs were heard by a set of air monitors when broadcast by the legitimate access points;

detecting an observed Service Set Identifier (SSID) and an observed Basic Service Set Identifier (BSSID) broadcast by a device on a wireless network;

comparing the observed SSID and the observed BSSID broadcast by the device with the listing of authorized SSIDs and authorized BSSIDs to check whether the observed SSID and the observed BSSID broadcast by the device are authorized;

if the observed SSID and the observed BSSID broadcast by the device appear in the listing of authorized SSIDs and authorized BSSIDs, testing for a false negative by:
  determining an observed signal strength at which the device is broadcasting the observed SSID and the observed BSSID,
  accessing the stored historical information to determine the signal strengths at which the observed SSID and the observed BSSID have been heard before by the set of air monitors when broadcast by a legitimate access point, and
  indicating that the device is a rogue wireless device when the observed signal strength at which the device is broadcasting the observed SSID and the observed BSSID does not match any of the signal strengths at which the observed SSID and the observed BSSID have been heard before by the set of air monitors when broadcast by a legitimate access point; and if one or more of the observed SSID and the observed BSSID broadcast by the device do not appear in the listing of authorized SSIDs and authorized BSSIDs, testing for a false positive by:
  prior to generating an alarm, determining whether the device is connected to the wired network, and
  indicating that the device is a rogue wireless device when it is determined that the device is broadcasting one or more of an unauthorized SSID and an unauthorized BSSID and is connected to the wired network.

2. The method of claim 1, further comprising the step of generating an alarm after the device is indicated to be a rogue wireless device.

3. The method of claim 1, wherein the step of testing for the false negative further comprises the steps of:
  using the observed signal strength at which the device is broadcasting the observed SSID and the observed BSSID to provide an approximate location of the device; and
  notifying a network administrator of the approximate location after indicating that the device is a rogue wireless device.

4. The method of claim 1, wherein the step of testing for the false negative further comprises the steps of:
  observing 802.11 beacon sequence numbers broadcast from the device for the observed BSSID;
  determining whether the 802.11 beacon sequence numbers form a monotonically increasing series; and
  indicating that the device is a rogue wireless device when the 802.11 beacon sequence numbers do not form a monotonically increasing series.

5. The method of claim 1, wherein the step of testing for the false positive further comprises the steps of:
  attempting to associate with the device that is broadcasting one or more of the unauthorized SSID and the unauthorized BSSID;
  attempting to communicate with an entity on the wired network when the step of attempting to associate is successful; and
  indicating that the device that is broadcasting one or more of the unauthorized SSID and the unauthorized BSSID is a rogue wireless device when the step of attempting to communicate with the entity on the wired network is successful.

6. The method of claim 1, wherein the step of testing for the false positive further comprises the steps of:
  detecting at least one packet broadcast from the device that is broadcasting one or more of the unauthorized SSID and the unauthorized BSSID;
  extracting at least one of a source or destination address of the at least one packet;
  indicating that the device that is broadcasting one or more of the unauthorized SSID and the unauthorized BSSID is a rogue wireless device when the at least one of the source or destination address of the at least one packet is from or to an entity on the wired network.

7. The method of claim 6, wherein the step of extracting at least one of a source or destination address comprises the steps of:
  determining if the at least one packet is encrypted or unencrypted;
  using an IP address of the at least one packet as the at least one of the source or destination address when the at least one packet is unencrypted; and
  using a media access control (MAC) address of the at least one packet as the at least one of the source or destination address when the at least one packet is encrypted or unencrypted.

8. The method of claim 1, wherein the step of testing for the false positive further comprises the steps of:
  listening for packets on the wireless network having the unauthorized BSSID;
  playing back at least one of the packets on the wireless network;
  monitoring the wired network; and
  indicating that the device is a rogue wireless device when the step of monitoring identifies at least one instance of the at least one packet from the step of playing back.

9. The method of claim 8, wherein the step of playing back at least one of the packets on the wireless network comprises the step of playing back at least one of the packets on the wireless network for a predetermined number of times.

10. The method of claim 8, wherein the step of playing back at least one of the packets on the wireless network comprises the step of playing back at least one of the packets on the wireless network for a predetermined time period.

11. The method of claim 1, further comprising the steps of:
  listening for dynamic host control protocol (DHCP) requests issued by a DHCP client device on the wired network;
  parsing the DHCP requests;
  inferring a device type of the DHCP client device issuing the DHCP requests based on the parsing of the DHCP requests;
  indicating that the DHCP client device issuing the DHCP requests is a rogue wireless device when the device type of the DHCP client device inferred based on the parsing of the DHCP requests does not match any device types authorized on the wired network.

12. The method of claim 1, wherein the step of testing for the false positive further comprises the steps of:
  monitoring first packets transmitted on the wireless network from or to the device that is broadcasting one or more of the unauthorized SSID and the unauthorized BSSID;
  monitoring second packets transmitted on the wired network;
  correlating the first packets with the second packets; and
  indicating that the device is a rogue wireless device when the step of correlating is successful.

13. The method of claim 12, wherein the step of correlating comprises the steps of:
comparing length of the first and second packets; and
comparing time at which the first and second packets were sent.

14. The method of claim 1, further comprising:
issuing a request to the air monitors to report all unique SSIDs and BSSIDs heard by the air monitors.

15. A tangible computer-readable storage medium that does not consist of a signal, said computer-readable storage medium storing computer-executable instructions causing a computing device to perform the method of claim 1.

16. A method of detecting rogue wireless network connections to a specific wired network, the method comprising the steps of:
storing a listing of authorized Service Set Identifiers (SSIDs) and authorized Basic Service Set Identifiers (BSSIDs) for legitimate access points;
storing historical information comprising signal strengths at which the authorized SSIDs and the authorized BSSIDs were heard by a set of air monitors when broadcast by the legitimate access points;
detecting an observed Service Set Identifier (SSID) and an observed Basic Service Set Identifier (BSSID) broadcast by a device on a wireless network;
comparing the observed SSID and the observed BSSID broadcast by the device with the listing of authorized SSIDs and authorized BSSIDs to check whether the observed SSID and the observed BSSID broadcast by the device are authorized; and
if the observed SSID and the observed BSSID broadcast by the device appear in the listing of authorized SSIDs and authorized BSSIDs, eliminating a false negative by:
determining an observed signal strength at which the device is broadcasting the observed SSID and the observed BSSID;
reviewing the stored historical information to determine the signal strengths at which the observed SSID and the observed BSSID have been heard before by the set of air monitors when broadcast by a legitimate access point; and
generating an alert when the observed signal strength at which the device is broadcasting the observed SSID and the observed BSSID does not match any of the signal strengths at which the observed SSID and the observed BSSID have been heard before by the set of air monitors when broadcast by a legitimate access point.

17. The method of claim 16, further comprising the steps of:
using the observed signal strength at which the device is broadcasting the observed SSID and the observed BSSID to determine an approximate location of the device; and
reporting the approximate location information to a network administrator.

18. The method of claim 16, further comprising:
issuing a request to the air monitors to report all unique SSIDs and BSSIDs heard by the air monitors.

19. A tangible computer-readable storage medium that does not consist of a signal, said computer-readable storage medium storing computer-executable instructions that, when executed, cause a computing device to perform a method of detecting rogue wireless network connections, the method comprising the steps of:
storing a listing of authorized Service Set Identifiers (SSIDs) and authorized Basic Service Set Identifiers (BSSIDs) for legitimate access points;
storing historical information comprising signal strengths at which the authorized SSIDs and the authorized BSSIDs were heard by a set of air monitors when broadcast by the legitimate access points;
detecting an observed Service Set Identifier (SSID) and an observed Basic Service Set Identifier (BSSID) broadcast by a device on a wireless network;
comparing the observed SSID and the observed BSSID broadcast by the device with the listing of authorized SSIDs and authorized BSSIDs to check whether the observed SSID and the observed BSSID broadcast by the device are authorized; and
if the observed SSID and the observed BSSID broadcast by the device appear in the listing of authorized SSIDs and authorized BSSIDs, eliminating a false negative by:
determining an observed signal strength at which the device is broadcasting the observed SSID and the observed BSSID;
reviewing the stored historical information to determine the signal strengths at which the observed SSID and the observed BSSID have been heard before by the set of air monitors when broadcast by a legitimate access point; and
generating an alert when the observed signal strength at which the device is broadcasting the observed SSID and the observed BSSID does not match any of the signal strengths at which the observed SSID and the observed BSSID have been heard before by the set of air monitors when broadcast by a legitimate access point.

* * * * *